(12) United States Patent
Lu et al.

(10) Patent No.: US 8,061,872 B2
(45) Date of Patent: Nov. 22, 2011

(54) OUTDOOR LAMP HAVING WATERPROOF FASTENING ASSEMBLY

(75) Inventors: Zhong-Liang Lu, Shenzhen (CN); Shih-Hsun Wung, Tu-Cheng (TW); Yong-Dong Chen, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 361 days.

(21) Appl. No.: 12/504,675

(22) Filed: Jul. 17, 2009

(65) Prior Publication Data

US 2010/0238662 A1    Sep. 23, 2010

(30) Foreign Application Priority Data

Mar. 20, 2009    (CN) .......................... 2009 1 0300990

(51) Int. Cl.
*F21V 29/00*    (2006.01)
(52) U.S. Cl. .......................... 362/267; 362/294; 362/373
(58) Field of Classification Search .................. 362/158, 362/218, 267, 294, 373, 457
See application file for complete search history.

(56) References Cited

U.S. PATENT DOCUMENTS

| 3,836,183 A * | 9/1974 | Battle ............................ 277/612 |
| 5,416,682 A * | 5/1995 | Bromhall ....................... 362/373 |
| 7,445,352 B2 * | 11/2008 | Lin ................................ 362/267 |
| 2005/0174780 A1 * | 8/2005 | Park ............................. 362/294 |

* cited by examiner

*Primary Examiner* — Y My Quach Lee
(74) *Attorney, Agent, or Firm* — Altis Law Group, Inc.

(57) ABSTRACT

A waterproof fastening assembly secures a first structure to a second structure. The first structure defines a number of through holes and a number of flanges surrounding the through holes, respectively. The second structure defines a number of screw holes and includes a number of LED light source modules. A connection shank extends through a corresponding through hole and screws in a corresponding screw hole. An elastic waterproof ring comprises an annular body and a number of protrusions protruding from a top surface of the body. When the first structure is secured to the second structure, the connection shank presses the protrusions to enable the elastic waterproof ring to deform outwardly and inwardly simultaneously. The flange of the first structure resists the outward deformation of the elastic waterproof ring, meanwhile the body of the elastic waterproof ring inwardly engages the connection shank.

13 Claims, 6 Drawing Sheets

OUTDOOR LAMP HAVING WATERPROOF FASTENING ASSEMBLY

BACKGROUND

1. Technical Field

The disclosure relates to an outdoor lamp, particularly an outdoor LED lamp including fasteners, particularly, a waterproof fastening assembly.

2. Description of Related Art

An outdoor lamp such as a street lamp includes a lamp body and a housing containing the lamp body therein. The lamp body is usually fixed to the housing by a number of ordinary screws. When the outdoor lamp is exposed to outside for a long period of time, the screws may be gradually eroded. Thus, rain or snow may creep through clearances between the screws and the housing of the outdoor lamp, and enter into the housing to thereby cause electrical short circuit and potential safety problems.

Accordingly, glue is applied to seal the clearances between the screws and the housing of the outdoor lamp. Generally, the glue is applied to fill to the clearances between the screws and the housing by a special glue-applying machine, and then the glue needs a period of time to dry after the application thereof. Apparently, this waterproof approach, i.e. using the glue, causes a high manufacture cost and a complex manufacture process.

What is needed, therefore, is an outdoor lamp including a waterproof fastening assembly, thereby overcoming the described limitations.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION

Figure 1:
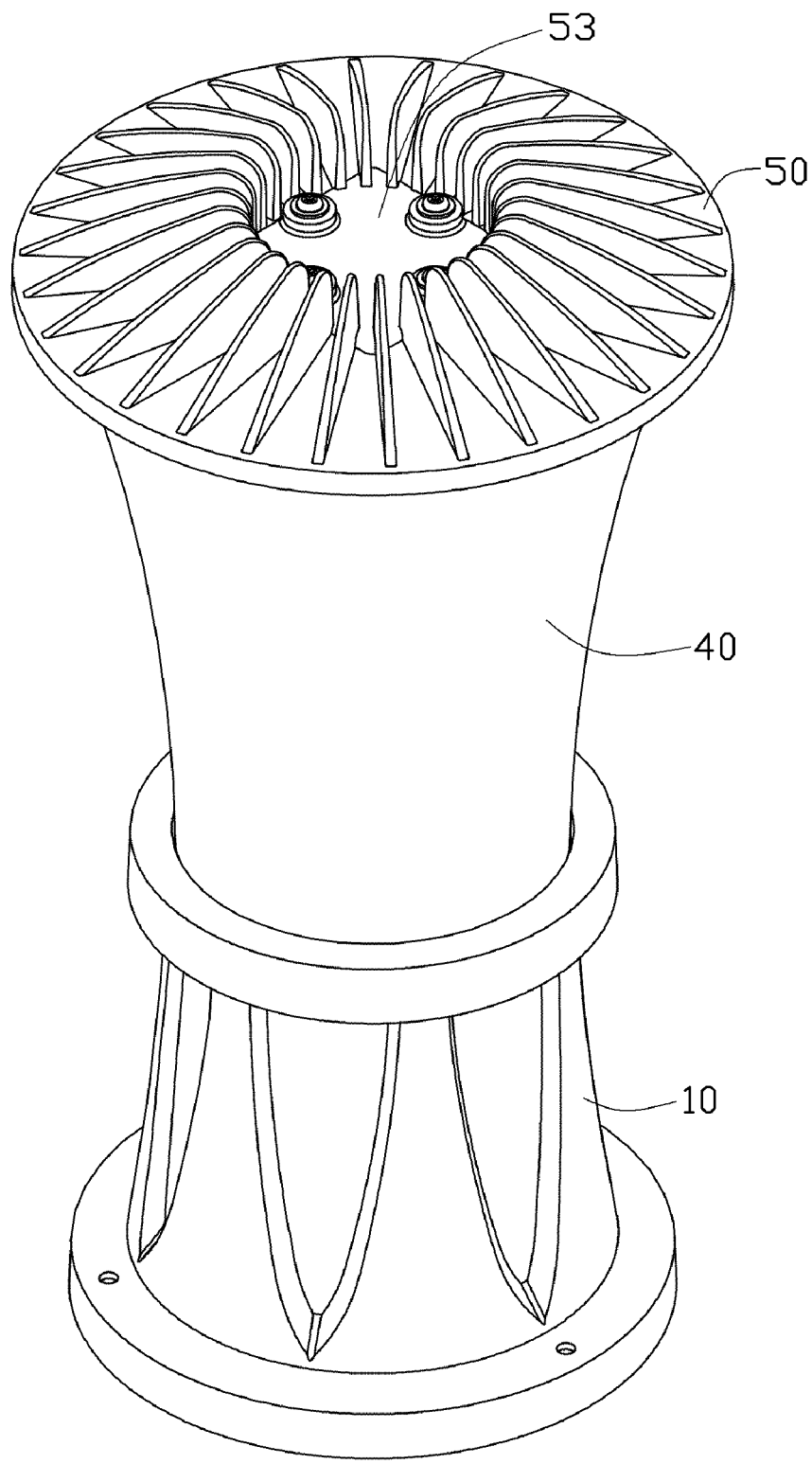
FIG. 1 is an assembled view of an outdoor lamp in accordance with an embodiment of the disclosure.
Figure 2:
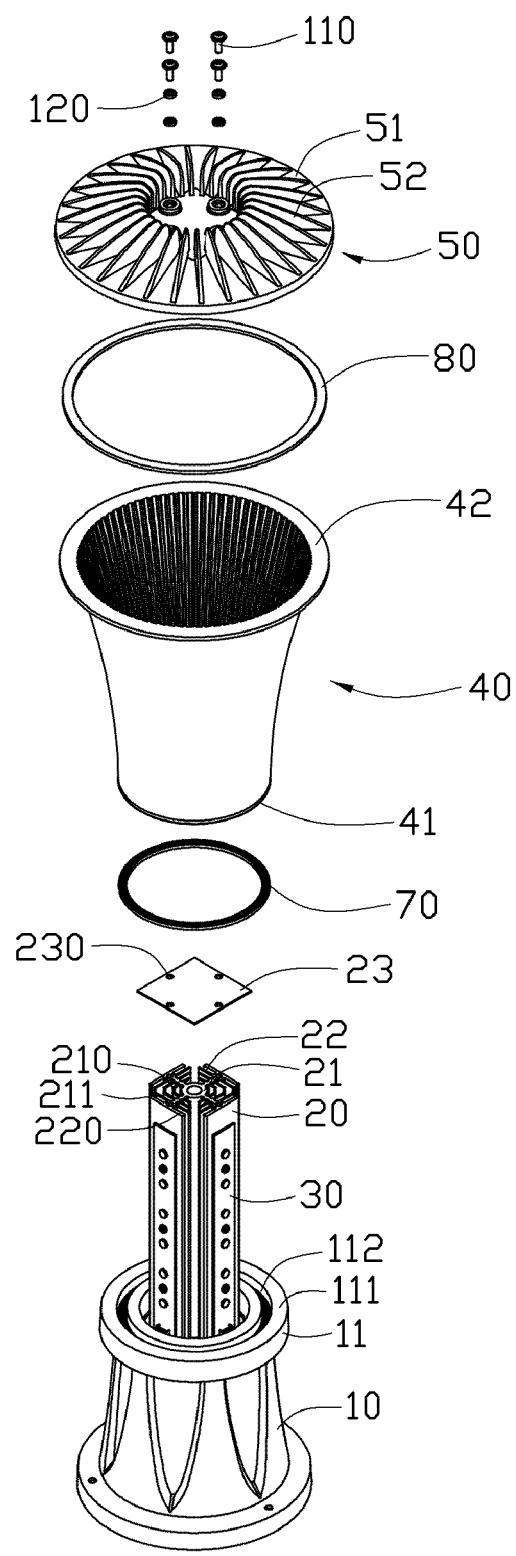
FIG. 2 is an isometric, exploded view of the outdoor lamp of FIG. 1.
Figure 3:
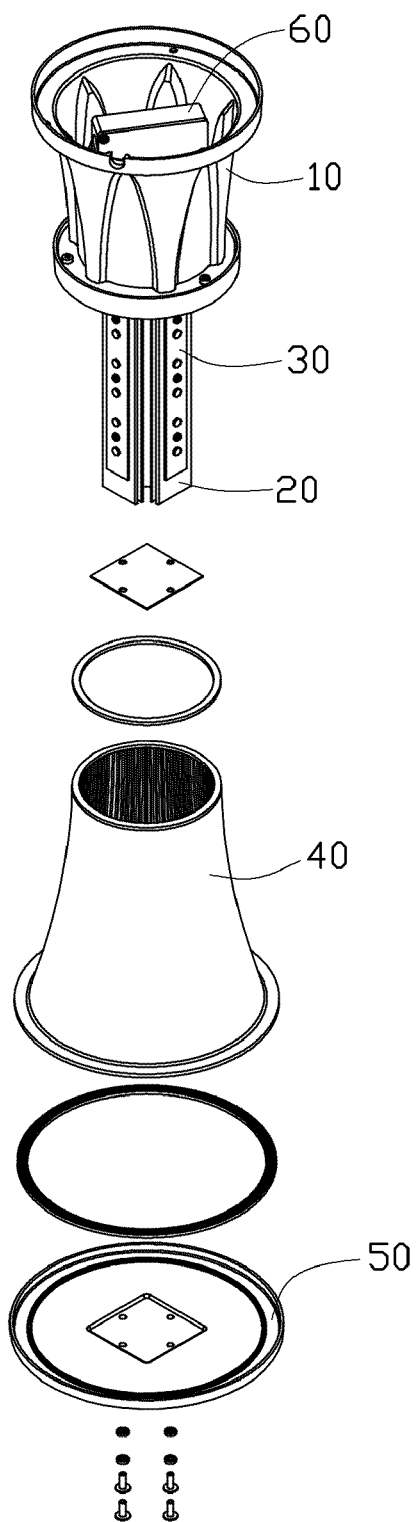
FIG. 3 is an inverted view of FIG. 2.

Referring to FIGS. 1-3, an outdoor LED lamp includes a lamp seat 10, a heat sink 20, a light source module 30, a transparent envelope 40, a lamp lid 50 and a power supply module 60. The envelope 40 has a truncated conical-shaped configuration and arranged between the seat 10 and the lid 50. The heat sink 20 is disposed inside the envelope 40 and connected between the seat 10 and the lid 50. The light source module 30 is mounted to the heat sink 20. The power supply module 60 is fixedly received in the seat 10.

The seat 10 has a truncated conical structure and is made of a metal with high heat dissipation. The seat 10 includes a fixing ring 11 positioned at a top end thereof. The fixing ring 11 includes a fixing surface 111 in a top thereof; the fixing surface 111 defines an annular groove 112 therein. The envelope 40 includes a bottom edge 41 and a top edge 42. A diameter of the bottom edge 41 of the envelope 40 is less than that of the top edge 42 of the envelope 40. An inner wall of the envelope 40 defines a number of grooves along a lengthwise direction thereof, to disperse light generated by the light source module 30. The bottom edge 41 is received in the groove 112 of the seat 10; preferably, a first elastic washer 70 is compressed between the bottom edge 41 and the top of the fixing ring 11 defining the groove 1 12. The top edge 42 is connected to the lid 50; preferably, a second elastic washer 80 is compressed between the top edge 42 and the lid 50. A bottom of the seat 10 defines a recess receiving the power supply module 60 therein.

The heat sink 20 includes an elongated cylindrical heat conducting post 21, a number of fins 22 and a heat conducting top plate 23. A number of side plates 210 protrude outwardly from a circumference of a side surface of the post 21. A top surface of a free end of each of the side plates 210 defines a screw hole 211. The fins 22 extend outwardly from two sides of each of the side plates 210. Areas of the fins 22 gradually increase along a direction away from the post 21. That is, the outermost one of the fins 22 has the largest area, and the light source module 30 is disposed on an outer surface of the outermost one of the fins 22. The light source module 30 includes an elongated printed circuit board mounted on the outer surface of the outermost fin 22 and a number of LEDs mounted on the printed circuit board. The top plate 23 is a rectangular metallic plate which disposed on the top end of the post 21 and covers top ends of the fins 22. The top plate 23 defines a number of first through holes 230 corresponding to the screw holes 211 of the side plates 210 of the post 21.

The lid 50 includes a circular flat plate 51, a number of fins 52 and a connection plate 53. The flat plate 51 defines an aperture (now shown) communicating with the envelope 40. The aperture is located at a central portion of the flat plate 51. The connection plate 53 is a rectangular metallic plate and disposed on a top surface of the flat plate 51 to cover the aperture. The fins 52 protrude upwardly from the top surface of the flat plate 51 and surround the connection plate 53. That is, the fins 52 form an annular fin assembly which has an inner side and an outer side. Heights of the fins 52 gradually decrease from the inner side to the outer side thereof. The fins 52 each have a straight bottom end connected with the top surface of the flat plate 51 and an arc top end. The connection plate 53 defines a number of second through holes 530 corresponding to the first through holes 230 of the top plate 23 and the screw holes 211 of the post 21.

Alternatively, the top plate 23 of the heat sink 20 can be omitted, and then the connection plate 53 of the lid 50 is directly secured to the side plates 210 of the post 21 of the heat sink 20. It is understood that structures of the lid 50 and heat sink 20 can be changed, so long as the lid 50 can be secured to the heat sink 20.

Figure 4:
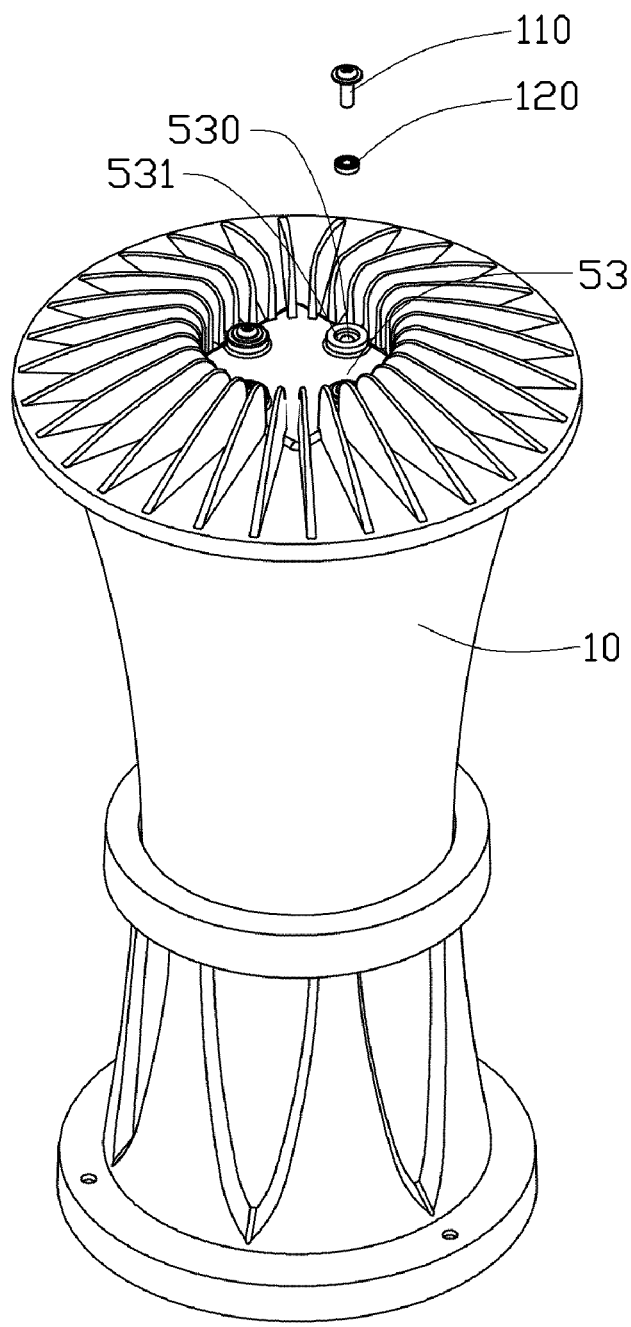
FIG. 4 is a view similar to FIG. 1, with a fastening assembly of the outdoor lamp being separated therefrom.
Figure 5:
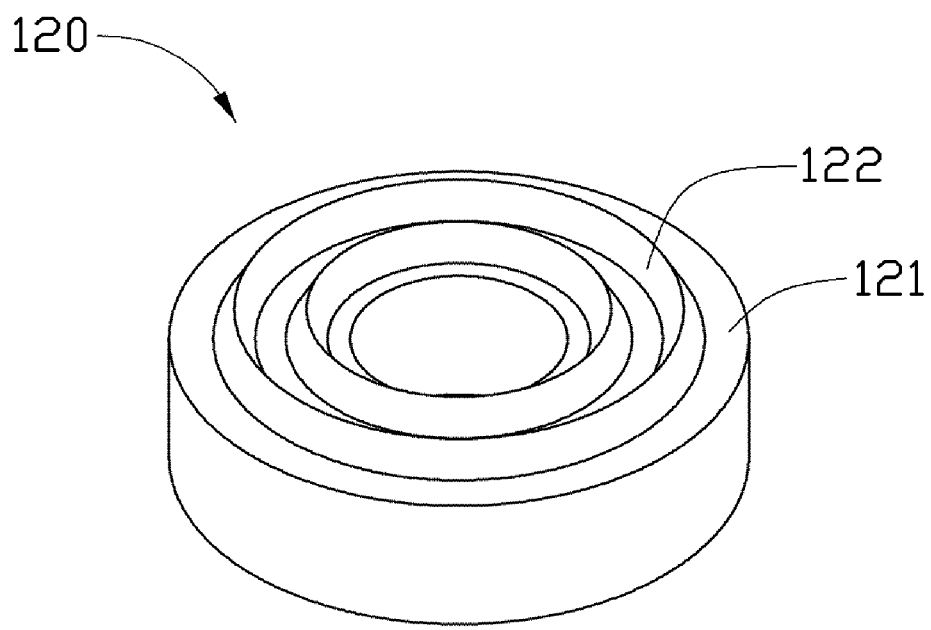
FIG. 5 is an isometric view of an elastic waterproof ring of the outdoor lamp of FIG. 4.
Figure 6:
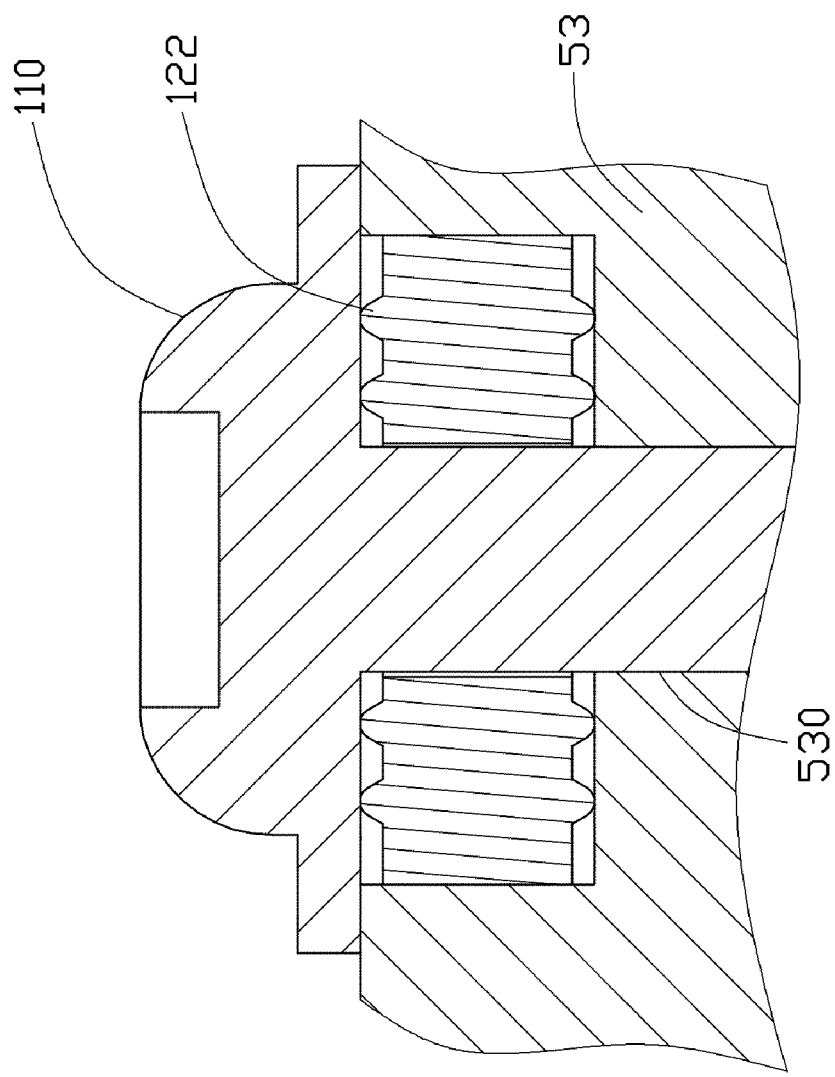
FIG. 6 is a partially cross-sectional view of the outdoor lamp of FIG. 1.

Referring to FIGS. 4-6, the lid 50 is secured to the heat sink 20 by a number of fastening assemblies extending through the second through holes 530 of the connection plate 53 of the lid 50 and the first through holes 230 of the top plate 23 of the heat sink 20 and screwing in the screw holes 211 of the side plates 210 of the post 21 of the heat sink 20. Each of the fastening assemblies includes a connection shank, an elastic waterproof ring 120 set around the connection shank, and a restricting element surrounding the elastic waterproof ring 120 and resisting an outward deformation of the elastic waterproof ring 120 when compressed. The connection shank is configured to pass through the connection plate 53 of the lid 50 and the top plate 23 of the heat sink 20 and inserted in the screw holes 211 of the side plates 210 of the post 21. The connection shank comprises a pressing part and a pole extending from the press part. In the present embodiment, the connection shank is a bolt 110, and the restricting element is a circular flange 531 extending upwardly from a round edge which defines the second through hole 530 of the connection plate 53. The flange 531 defines a central aperture communicating with the second through hole 530, and a diameter of the aperture of the flange 531 is larger than that of the second through hole 530. Thus, the flange 531 and the connection plate 53 cooperatively define a step. The elastic waterproof ring 120 is placed on the step and surrounded by the flange 531. The elastic waterproof ring 120 includes an annular body 121 and a number of ring-like protrusions 122 equidistantly protruding from top and bottom surfaces of the body 121.

When the bolt 110 sequentially extends the second through hole 530 of connection plate 53 of the lid 50 and the first through hole 230 of the top plate 23 of the heat sink 20 and is screwed in the screw hole 211 of the side plate 210 of the post 21 of the heat sink 20, an external force is exerted by the screw cap of the bolt 110 to press the protrusions 122 of the elastic waterproof ring 120, which protrude upwardly from the top surface of the body 121. The pressing force on the protrusions 122 causes the elastic waterproof ring 120 to have an extent of elastic deformation along both radially outward and inward directions. In other words, the elastic waterproof ring 120 expands radially inwardly and outwardly. At the same time, the elastic waterproof ring 120 is located between the pole of the bolt 110 and the flange 531. The expanded elastic waterproofing ring 120 hermetically engages with the flange 531 along the radially outward direction and hermetically engages with the pole of the bolt 110 along the radially inward direction. Thus, the elastic waterproofing ring 120 achieves an excellent sealing effectiveness for the second through hole 530 of the connection plate 53.

When a diameter of a screw cap of the bolt 110 is larger than that of the flange 531, a height of the elastic waterproof ring 120 is designed to be larger than that of the flange 531. That is, tops of the protrusions 122 of the elastic waterproof ring 120 extend beyond a top surface of the flange 531 before the elastic waterproof ring 120 is compressed by the screw cap of the bolt 110. After the elastic waterproof ring 120 is compressed by the screw cap of the bolt 110, the tops of the protrusions 122 of the elastic waterproof ring 120 are coplanar with the top surface of the flange 531 of the connection plate 53 of the lid 50.

Alternatively, when the diameter of the screw cap of the bolt 110 is less than that of the flange 531, the height of the elastic waterproof ring 120 need not to be particularly limited; that is, the height thereof can be less, larger or equal to that of the flange 531. The only requirement is that when the cap of the bolt 110 presses the elastic waterproof ring 120, the flange 531 can resist the outward deformation of the elastic waterproof ring 120 and the body 121 of the deformed elastic waterproof ring 120 can tightly engage with the pole of the bolt 110, thereby to achieve an excellent seal therebetween.

The bolt 110 of the present embodiment can be replaced by any other connection shank with screw thread or without screw thread, and the protrusions 122 can be only formed on the top surface of the body 121 or only on the bottom surface of the body 121. In addition, the restricting element of the present embodiment is not limited to be an element integrally formed with the lid 50 (such as the flange 531). For example, the restricting element can be a separate element such as a metallic ring which disposed around the second through hole 530 of the connection plate 53 and then secured to the connection plate 53 by, for example, welding.

In assembling the outdoor lamp, the light source modules 30 are mounted to the heat sink 20. A bottom end of the heat sink 20 is secured to the seat 10. The bottom edge 41 of the envelope 40 is received in the groove 112 of the seat 10 with the first elastic washer 70 sandwiched therebetween. The lid 50 is placed on the top edge 42 of the envelope 40 with the second elastic washer 80 sandwiched therebetween. A number of fastening assemblies are used to secure the lid 50 to the heat sink 20. In detail, a number of elastic waterproof rings 120 are received in the corresponding flanges 531 of the lid 50, a number of bolts 110 extend through the second through holes 530 of the connection plate 53 and the bodies 121 of the waterproof rings 120, and the corresponding first through holes 230 of the top plate 23 of the heat sink 20, and are screwed in the screw holes 211 of the side plates 210 of the post 21 of the heat sink 20, whereby the lid 50, the envelope 40 and the heat sink 20 are hermetically fixed together.

It is to be understood, however, that even though numerous characteristics and advantages of the present embodiments have been set forth in the foregoing description, together with details of the apparatus and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

The invention claimed is:

1. An LED lamp comprising:
   a seat;
   a lid defining a plurality of first through holes and a plurality of annular flanges, each of the flanges protruding from an edge of the lid defining a corresponding first through hole thereof;
   a cylindrical transparent envelope arranged between the seat and the lid;
   a heat sink received in the envelope, the heat sink comprising a bottom end connected to the seat and a top end defining a plurality of screw holes corresponding to the first through holes of the lid;
   a plurality of LEDs mounted on the heat sink; and
   a plurality of fastening assemblies extending through the first through holes of the lid and screwing in the screw holes of the top end of the heat sink to secure the lid to the top end of the heat sink, each of the fastening assemblies comprising:
   a connection shank comprising a pressing part and a pole downwardly extending from the pressing part, the pole extending through a corresponding first through hole of the first through holes of the lid and inserting in a corresponding screw hole of the screw holes of the heat sink; and
   an elastic waterproof ring received in a corresponding flange of the flanges of the lid, the elastic waterproof ring comprising an annular body defining a through hole communicating with a corresponding first through hole and a plurality of protrusions protruding from a top surface of the body;
   wherein when the lid is secured to the top end of the heat sink, the pressing part of the connection shank presses the protrusions of the elastic waterproof ring to enable elastic waterproof ring to deform outwardly and inwardly simultaneously, the flange of the lid resists the outward deformation of the elastic waterproof ring, meanwhile the body of the elastic waterproof ring inwardly engages the pole of the connection shank.

2. The LED lamp of claim 1, wherein the lid comprises a flat plate defining aperture communicating with the envelope, a connection plate disposed on the flat plate to cover the aperture, and a plurality of fins protruding upwardly from a top surface of the flat plate and surrounding the connection plate, the connection plates defines the first through holes and form the protruded flanges.

3. The LED lamp of claim 2, wherein the fins of the lid form an annular fin assembly which has an inner side and an outer side, and heights of the fins gradually decrease from the inner side to the outer side thereof.

4. The LED lamp of claim 2, wherein the heat sink comprises an elongated cylindrical heat conducting post, a plurality of fins and a heat conducting top plate, a plurality of side plates protrudes outwardly from a circumference of a side surface of the post, top surfaces of free ends of the side plates defines the screw holes, the top plate defines a plurality of second through holes corresponding to the first through holes and the screw holes.

5. The LED lamp of claim 4, wherein the fins extend outwardly from two sides of each of the side plates of the post.

6. The LED lamp of claim 5, wherein areas of the fins of the heat sink gradually increase along a direction away from the post, and the LEDs are disposed on outer surfaces of outermost fins of the fins.

7. The LED lamp of claim 1, wherein an inner wall of the envelope defines a number of grooves along a lengthwise direction thereof to disperse light generated by the LEDs.

8. A waterproof fastening assembly adapted for securing a first structure to a second structure, the first structure defining a plurality of through holes and a plurality of flanges surrounding the through holes, respectively, the second structure defining a plurality of screw holes corresponding to the through holes, respectively, and having at least an LED light source module, the waterproof fastening assembly comprising: a connection shank extending through a corresponding through hole of the through holes of the first structure and being screwed in a corresponding screw hole of the screw holes of the second structure; and an elastic waterproof ring comprising an annular body set around the connection shank and received in a corresponding flange of the flanges and a plurality of protrusions protruding from a top surface of the body;

wherein when the first structure is secured to the second structure by the waterproof fastening assembly, the connection shank presses the protrusions to enable the elastic waterproof ring to deform outwardly and inwardly simultaneously, the corresponding flange of the flanges of the first structure resists the outward deformation of the elastic waterproof ring, meanwhile the body of the elastic waterproof ring inwardly engages the connection shank.

9. The waterproof fastening assembly of claim 8, wherein the protrusions are ring-like and equidistantly formed on the top surface of the body of the elastic waterproof ring.

10. The waterproof fastening assembly of claim 9, wherein the protrusions are also formed on the bottom surface of the body of the elastic waterproof ring.

11. The waterproof fastening assembly of claim 8, wherein the connection shank comprises a pressing part and a pole extending downwardly from the pressing part.

12. The waterproof fastening assembly of claim 11, wherein a diameter of the pressing part is larger than that of the flange of the first structure, a height of the elastic waterproof ring is larger than that of the flange of the first structure, whereby the protrusions of the elastic waterproof ring extend upwardly beyond a top surface of the flange of the first structure before the elastic waterproof ring is compressed by the pressing part.

13. The waterproof fastening assembly of claim 12, wherein tops of the protrusions of the elastic waterproof ring are coplanar with the top surface of the flange of the first structure after the elastic waterproof ring is compressed by the pressing part.

* * * * *